United States Patent
Kato (10) Patent No.: US 7,414,649 B2
(45) Date of Patent: Aug. 19, 2008

(54) CAMERA APPARATUS THAT IS CONTROLLABLE BY AN OPTICAL SIGNAL PICKED UP IN AN IMAGE BY THE CAMERA APPARATUS, AND A METHOD FOR OPERATING THE SAME

(75) Inventor: Yoshiyuki Kato, Higashiyamato (JP)

(73) Assignee: Casio Computer Co., Ltd., Tokyo (JP)

( * ) Notice: Subject to any disclaimer, the term of this patent is extended or adjusted under 35 U.S.C. 154(b) by 331 days.

(21) Appl. No.: 10/511,978

(22) PCT Filed: Dec. 26, 2003

(86) PCT No.: PCT/JP03/17035
§ 371 (c)(1),
(2), (4) Date: Oct. 20, 2004

(87) PCT Pub. No.: WO2004/062264
PCT Pub. Date: Jul. 22, 2004

(65) Prior Publication Data
US 2005/0206748 A1    Sep. 22, 2005

(30) Foreign Application Priority Data
Dec. 27, 2002  (JP) ............................. 2002-378832
Nov. 7, 2003   (JP) ............................. 2003-378005

(51) Int. Cl.
    H04N 5/232  (2006.01)
(52) U.S. Cl. ............... 348/211.6; 348/211.2; 348/211.9; 348/349
(58) Field of Classification Search ............ 348/211.99, 348/211.1–211.6
See application file for complete search history.

(56) References Cited

U.S. PATENT DOCUMENTS

| 5,146,353 A | 9/1992 | Isoguchi et al. |
| 6,144,804 A * | 11/2000 | Inoue .......................... 396/51 |
| 2001/0022861 A1 | 9/2001 | Hiramatsu |
| 2003/0184645 A1* | 10/2003 | Biegelsen et al. .......... 348/14.1 |

FOREIGN PATENT DOCUMENTS

| CN | 1214591 A | 4/1999 |
| JP | 5-30414 A | 2/1993 |
| JP | 5-145822 A | 6/1993 |

(Continued)

OTHER PUBLICATIONS

Translation of Horikawa et al., JP 2000-165850.*

Primary Examiner—NgocYen T. Vu
Assistant Examiner—Adam L Henderson
(74) Attorney, Agent, or Firm—Frishauf, Holtz, Goodman & Chick, P.C.

(57) ABSTRACT

An image pickup device such as CCD of a camera is substituted for a photo detector of infrared light emitted from an infrared remote control unit. When infrared light is detected based on an image signal output from the image pickup device, a transmitting position of infrared light in the object is detected. The camera executes such operations that transmitting positions detected are set as a focus detecting range in focus control, an exposure detecting range in exposure control, and a color evaluation range in white balance control.

5 Claims, 7 Drawing Sheets

FOREIGN PATENT DOCUMENTS

| | | |
|---|---|---|
| JP | 06-022194 A | 1/1994 |
| JP | 6-98253 A | 4/1994 |
| JP | 9-74504 A | 3/1997 |
| JP | 9-74505 A | 3/1997 |
| JP | 11-168749 A * | 6/1999 |
| JP | 2000-50145 A | 2/2000 |
| JP | 2000-165850 A | 6/2000 |
| JP | 2002-152561 A | 5/2002 |

* cited by examiner

| CODE VALUE | CONTENTS OF COMMAND OPERATION |
|---|---|
| 01110000 | AREA-DESIGNATING AF |
| 00011100 | WEIGHTING AE IN INDIVIDUAL AREAS |
| 00000111 | AREA-DESIGNATING AWB |

CAMERA APPARATUS THAT IS CONTROLLABLE BY AN OPTICAL SIGNAL PICKED UP IN AN IMAGE BY THE CAMERA APPARATUS, AND A METHOD FOR OPERATING THE SAME

This application is a U.S. National Phase Application under 35 USC 371 of International Application PCT/JP/03/17035 filed Dec. 26, 2003.

TECHNICAL FIELD

The present invention relates to a camera apparatus provided with an image pickup device, a camera control method, and a recording medium having the control camera recorded therein.

BACKGROUND ART

Heretofore, in a camera apparatus by which a picture image of an object picked up by a COD (Charge Coupled Device) is recorded in a recording medium as picture image data, the CCD has been substituted for a photo detector of an infrared remote control unit for infrared light by utilizing such fact that an image pickup device such as CCD can detect infrared light emitted from the infrared remote control unit (see paragraphs [0011] to [0013] in Japanese Patent Application KOKAI Publication No. 6-22194). The apparatus involves such an advantage that a light-receiving unit for an infrared remote control unit to be equipped on a main body of the apparatus may be eliminated.

However, in the above-described camera apparatus, the remote control unit makes merely the camera apparatus to perform a predetermined operation on the basis of presence of detected infrared light in the CCD, so that the camera apparatus does not enhance user's usability thereof though an elimination of a photo detector is possible.

DISCLOSURE OF INVENTION

An embodiment of a camera apparatus according to the present invention comprises an image pickup device which outputs an object image as a pick-up image signal, a recording unit which records the image signal output from the image pickup device, a detector which detects a transmitting position of an optical signal in the object image based on the image signal output from the image pickup device, and a controller which executes a control operation in response to the transmitting position detected by the detector.

BRIEF DESCRIPTION OF DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

BEST MODE FOR CARRYING OUT THE INVENTION

In the following, an embodiment of the present invention will be described by referring to the accompanying drawings. The present embodiment relates to a digital camera involving usual functions such as AF (automatic focus), AE (automatic exposure control), and AWB (automatic white balance control) as well as configured to make possible to pick-up an object by user's remote control operation of an infrared remote control unit attached to the apparatus main body.

Figure 1:
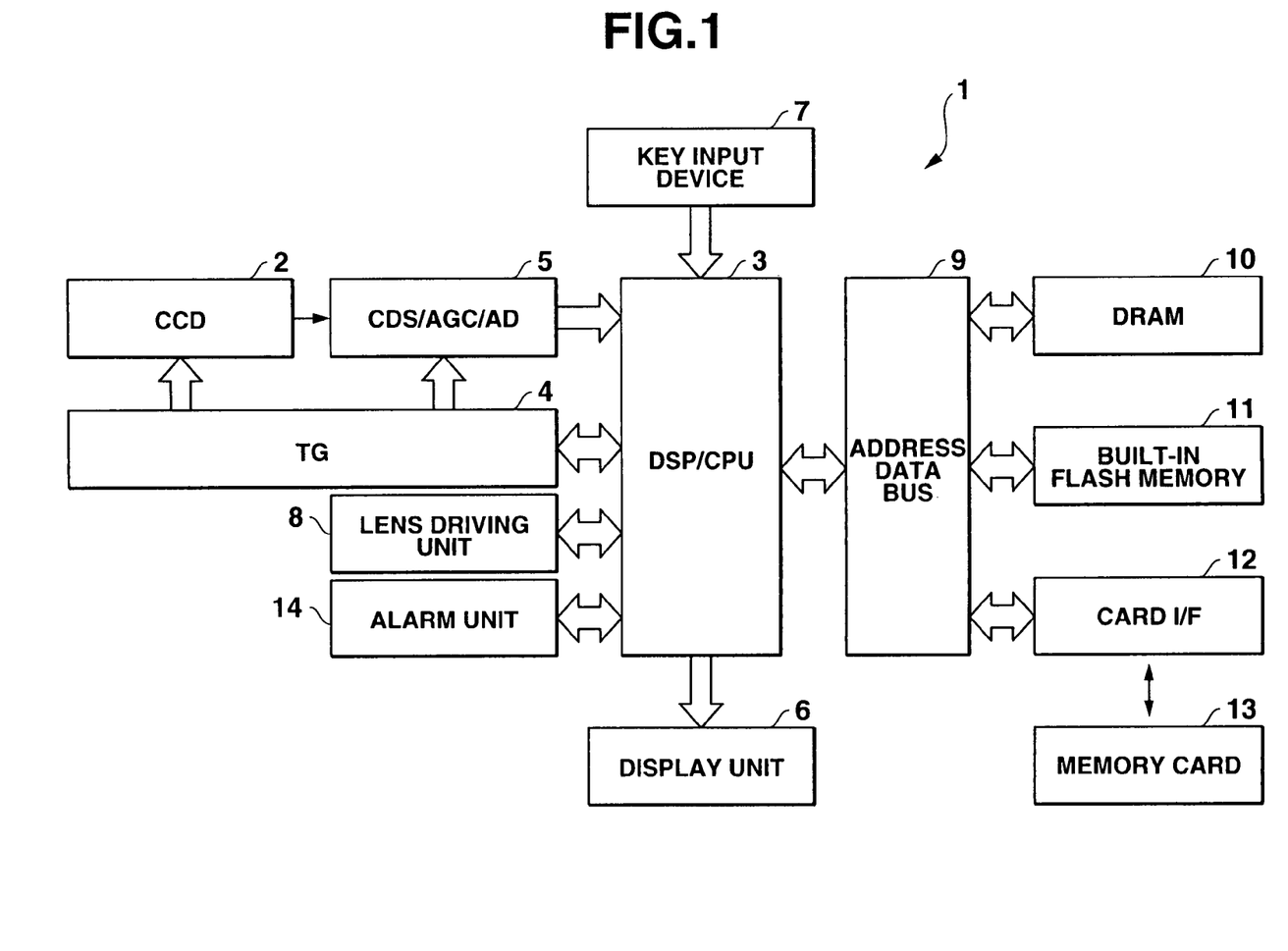
FIG. 1 is a block diagram showing a digital camera which illustrates an embodiment of the present invention.

FIG. 1 is a block diagram showing an electrical configuration of a digital camera 1 according to the present invention. The digital camera 1 has a CCD (image pickup device) 2, and a DSP/CPU 3. The CCD 2 photoelectrically converts an object imaged through an optical system involving a focus lens, a zoom lens and the like (not shown) to output an analog image pickup signal in accordance with an optical image of the object. The optical system includes a blue glass infrared cut filter for cutting off infrared light of around 750 nm to 950 nm by which picked-up image is adversely affected.

The DSP/CPU 3 is a one-chip microcomputer having a variety of digital signal processing functions including compression/expansion of image data according to JPEG standard, besides the DSP/CPU 3 controls respective sections of the digital camera 1. To the DSP/CPU 3 is connected a TG (Timing Generator) 4 for driving the COD 2. A unit circuit (CDS/AGC/AD) (Correlated Double Sampling/Automatic Gain Control/Analog-to-digital converter) 5 to which an image pickup signal output from the CCD 2 is to be input is connected to the TG 4. The unit circuit 5 comprises a CDS circuit for removing a noise from an output signal from the CCD 2 in accordance with correlated double sampling, an automatic gain controller (AGC) for amplifying the image pickup signal from which a noise has been removed, and an A/D converter (AD) for converting the image pickup signal which has been amplified into a digital signal. The output signal from the CCD 2 is converted into a digital signal through the unit circuit 5, and the resulting signal is delivered to the DSP/CPU 3.

A display unit 6, a key input device 7, and a lens driving unit 8 are connected to the DSP/CPU 3. Further, a DRAM 10, a built-in flash memory 11, and a card interface 12 are connected to the DSP/CPU 3 through an address data bus 9. To the card interface 12 is connected a memory card 13 mounted detachably in a card slot defined on the camera main body (not shown).

The lens driving unit 8 comprises a stepping motor for driving the focus lens and the zoom lens in the directions of their optical axes, respectively, and a motor driver for driving these lenses in response to control signals transmitted from the DSP/CPU 3. The DRAM 10 serves as a buffer storing temporarily image data of an object which has been picked up by the CCD 2 and digitized in an image pick-up standby state, and further it is used also for a working memory of the DSP/CPU 3. The image data stored temporarily in the DRAM 10 is compressed, and recorded finally in the memory card 13 (recording unit).

The display unit 6 includes a color LCD and a driver therefor, and displays a picture image of the object picked up by the CCD 2 as a through image in an image pick-up standby mode, while it displays a recording image read out from the memory card 13 and expanded in a reproduction mode. The key input device 7 includes a plurality of operation keys such as a shutter key, a power source key, a mode selecting key, and cross-shape key, and the key input device 7 outputs key input signals to the DSP/CPU 3 in response to key operations by a user. The alarm unit 14 sounds one or plural types of alarm sound(s) in response to instructions of the DSP/CPU 3.

Figure 2:
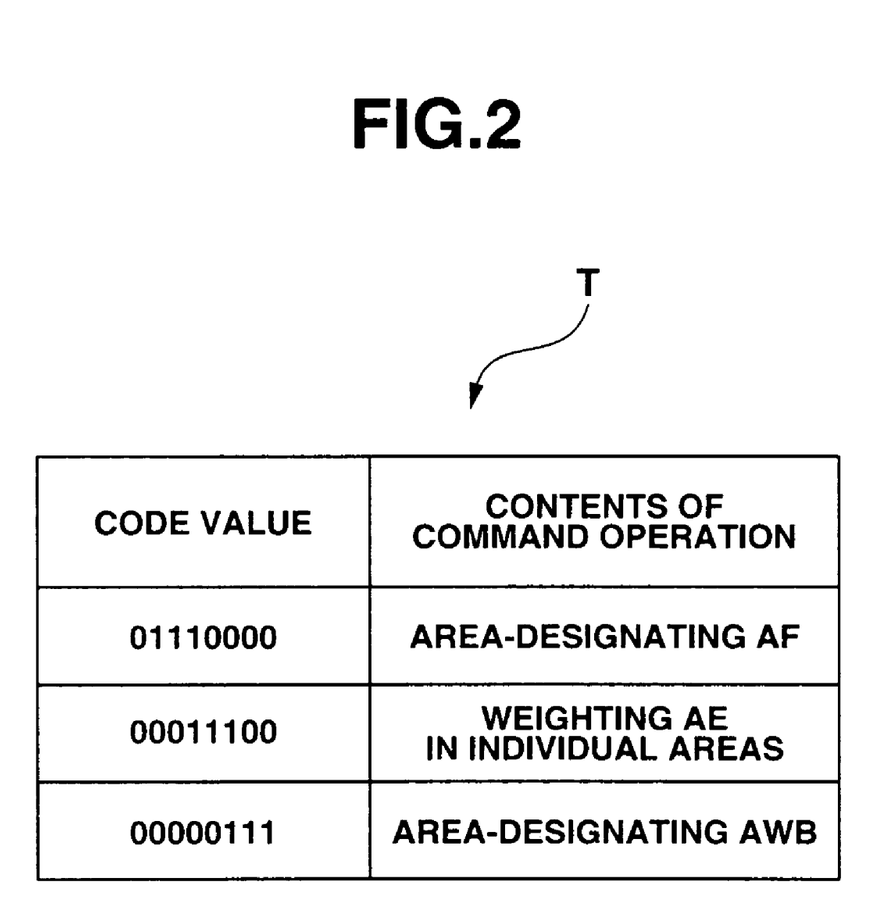
FIG. 2 is a schematic diagram showing data contents of a command table stored in a built-in flash memory.

In the built-in flash memory 11, a control program for causing the DSP/CPU 3 to control respective sections of the digital camera 1 as well as a variety of data used for operating the DSP/CPU 3 have been stored. When the DSP/CPU 3 is operated in accordance with the control program, it functions as a first detector, a second detector, a controller, a specifying unit, and a recognition unit. In the built-in flash memory 11, data forming a command table T shown in FIG. 2 have been stored. The command table T is a table indicating values of specified code data (code values) included in a remote control unit signal transmitted from the above-described infrared remote control unit and a command for an operation represented thereby.

In the following, operations in the case where a remote-controlled image pick-up mode is established by a user in the digital camera 1 configured as described above will be explained.

First, the remote-controlled image pick-up mode is described hereinafter. The remote-controlled image pick-up mode is one of plural modes which have been defined previously as image pick-up modes. In the remote-controlled image pick-up mode, when a user operates a predetermined button in the infrared remote control unit, a picture can be selectively picked up in plural types (three types in the present embodiment) of modes in response to each position of the infrared remote control unit in an area of an object to be picked up. In the present embodiment, the infrared remote control unit transmits a signal wherein a code data for detection having a predetermined bit width and repeating ON-OFF state has been added to a head of a code data for command. In this case, each bit width of a part of the code data for detection (the infrared signal shown in FIG. 5) has been set to a length corresponding to twice longer than that of a driving cycle (frame period) of the CCD 2 in case of processing for block detection which will be mentioned later (see FIG. 5), and the infrared remote control unit emits infrared light having a wavelength of around 950 nm to 1050 nm which passes through the above-mentioned blue glass infrared cut filter.

Figure 3:
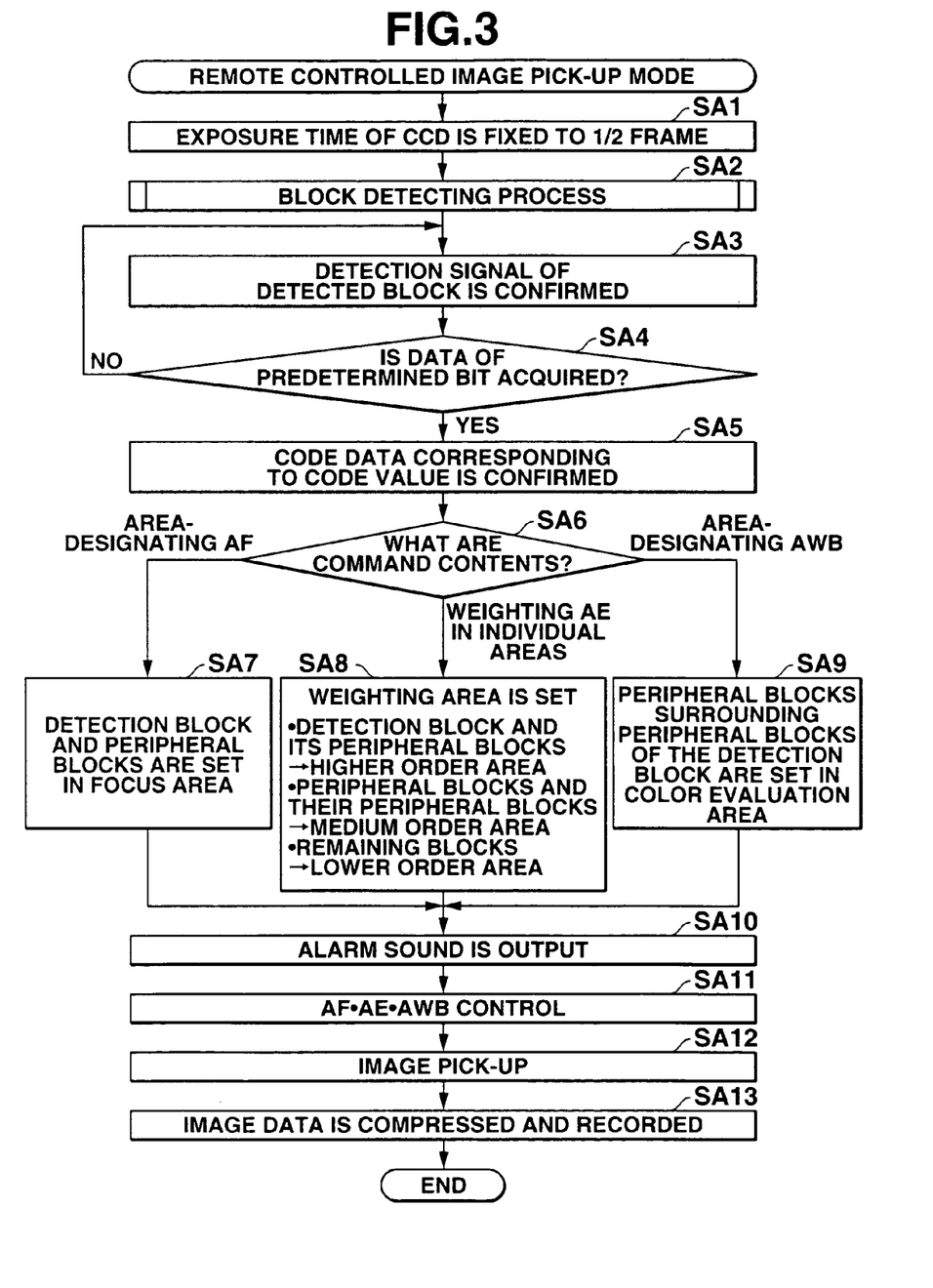
FIG. 3 is a flowchart showing a control procedure according to DSP/CPU (Digital Signal Process/Central Processing Unit) 3 in an image pick-up mode by a remote control unit.
Figure 4:
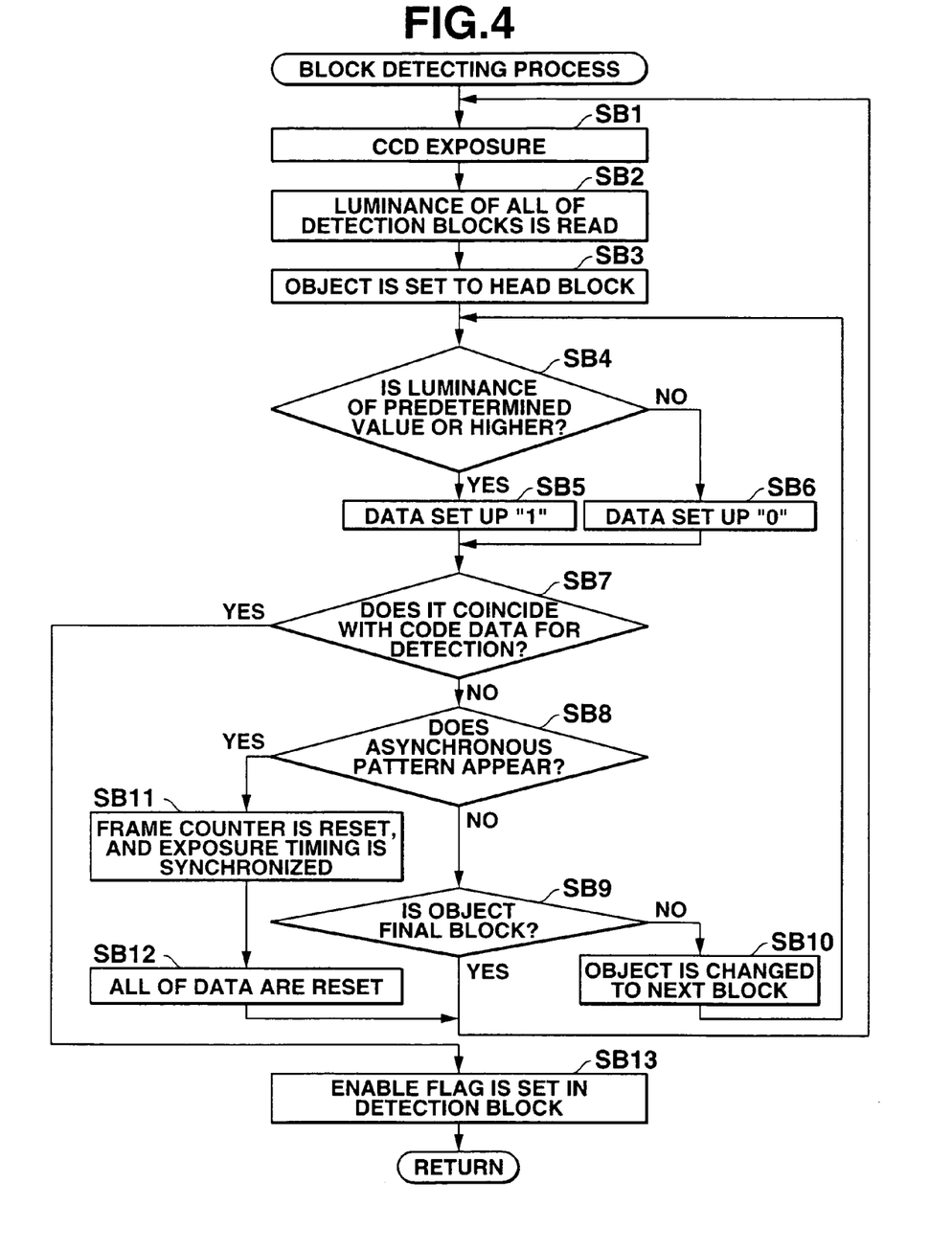
FIG. 4 is a flowchart showing contents in a process for detecting blocks.
Figure 5:
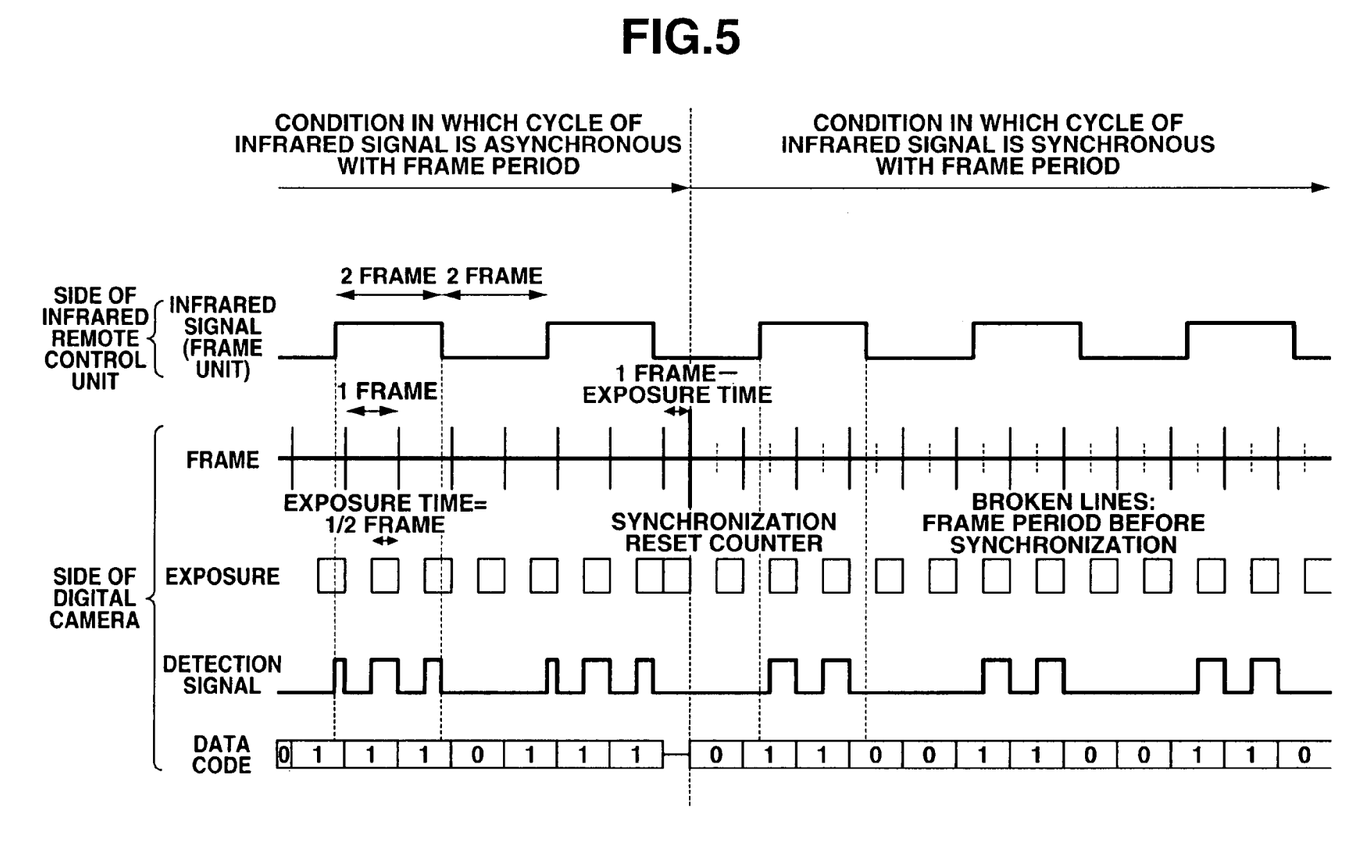
FIG. 5 is a timing chart showing operations in the process for detecting blocks.
Figure 6:
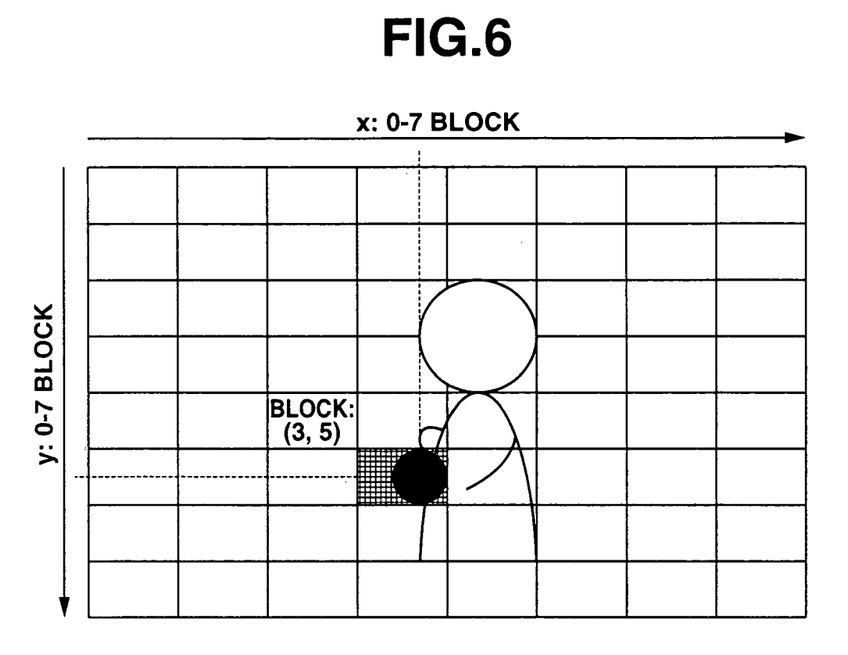
FIG. 6 is a diagram illustrating blocks to be an object for detecting luminance in a picked-up picture image.

In the following, specific operations in the remote-controlled image pick-up mode will be described in accordance with a flowchart showing a control procedure by means of the DSP/CPU 3 shown in FIG. 3. When the remote-controlled image pick-up mode is established, the DSP/CPU 3 fixes an exposure time in the CCD 2 to ½ frame to start continuous exposure in a predetermined driving cycle (frame period) (step SA1), and then, the procedure proceeds to a block detecting process (step SA2). FIG. 4 is a flowchart showing details of the block detecting process (step SA2), and FIG. 5 is a timing chart showing operations of the digital camera 1 during a period wherein the infrared remote control unit transmits code data for detection in an infrared signal, and a cycle of the infrared signal is synchronized with a frame period. In the block detecting process, the CCD 2 is allowed to expose by ½ frame period in the frame period as mentioned above (step SB1). The exposure time of the CCD 2 corresponds to the latter half of the frame period. Luminance data in each color of a picture image corresponding to an amount of one frame acquired as a result of exposure are stored in a buffer (step SB2). Then, a pictorial image region is sectioned into detection blocks (0, 0) to (7, 7) obtained by dividing equally the region in x direction and y direction as shown in FIG. 6, and the following steps are continued. In this case, the number and the shape of these blocks may be the ones other than those described above.

A head block (0, 0) is set as an objective block (step SB3), and then, it is determined whether there is a pixel having a predetermined luminance or higher luminance in the block. In case of presence, it is determined that infrared light is lighting (YES in step SB4), and data code "1" is set in a buffer region for accumulating data codes maintained previously in each detection block in the DRAM 10 (step SB5). In case of absence, it is determined that infrared light is lighting out (NO in step SB4), and data code "0" is set (step SB6). Such process is made on all the remaining detection blocks being the object to be processed (NO in steps SB7 to SB9, step SB10). When the process relating to the last detection block is finished (NO in both of steps SB7 and SB8, while YES in step SB9), then, the process is returned to step SB1, the CCD 2 is allowed to be exposed at the next exposure timing, and the processes of from step SB2 are repeated. Therefore, data in response to the number corresponding to the number of exposure times are sequentially accumulated in the aforementioned buffer region in every detection blocks in the DRAM 10.

As mentioned above, a bit width of a signal of code data for detection transmitted from the infrared remote control unit has been set to a length twice longer than the frame period of the CCD 2 (the infrared signal of FIG. 5). Therefore, the code data accumulated in each detection block during a period wherein the above-described processes are repeated becomes a lighting bit ("11") of two bits with respect to one lighting of infrared light in the case where a signal cycle of infrared light is synchronized with the frame period. On the contrary, when it is not synchronized with each other, the data code becomes a lighting bit ("111") of three bits with respect to one lighting of infrared light (the data code in FIG. 5).

Accordingly, it is determined whether or not a bit pattern showing the above-described asynchronous state appears on code data of the detection block at the time of accumulating code data in each detection block during repeating the above-described processes (step SB8). In case of appearance (YES in step SB8), a frame counter for driving the CCD 2 is reset at that time, and its exposure timing is displaced by ½ frame to make the timing in synchronous with a signal cycle of infrared light (step SB11). The timing at which the frame counter is to be reset is "frame time-exposure time" which is the one at which a counted value of the frame counter reaches a counted value of ½ frame. Thereafter, all the code data accumulated in every detection blocks are reset (step SB12), the process returns to step SB1, so that the aforementioned processes are repeated from the beginning, and code data are newly accumulated in every detection blocks.

On the other hand, it is determined whether or not such code data coincident with those of detection are accumulated in any of detection blocks while repeating the above-described processes. When it has been determined (YES in step SB7), an enable flag is set to the detection block being the object at that time (step SB13). The detection block (the detection block of (3, 5) in the embodiment of FIG. 6) is settled as a transmitting position of infrared light. Thus, the block detecting process is completed, and its procedure returns to the main routine in FIG. 3.

Subsequently, the CCD 2 is allowed to be exposed with the frame period in the main routine, and in addition, acquisition of code data is started while confirming a detection signal (luminance) with respect to the detection block settled in the block detecting process (step SA3). The process is continued until data having a previously determined bit width can be acquired. After the data of the previously determined bit width, i.e. code data for command has been acquired (YES in step SA4), such code data being coincident with an acquired code value is confirmed in the command table T (step SA5), and further, contents of the command operation corresponding to the coincident code data are confirmed (step SA6). Thereafter, the following processes are carried out in response to the confirmed command operation.

Figure 7:
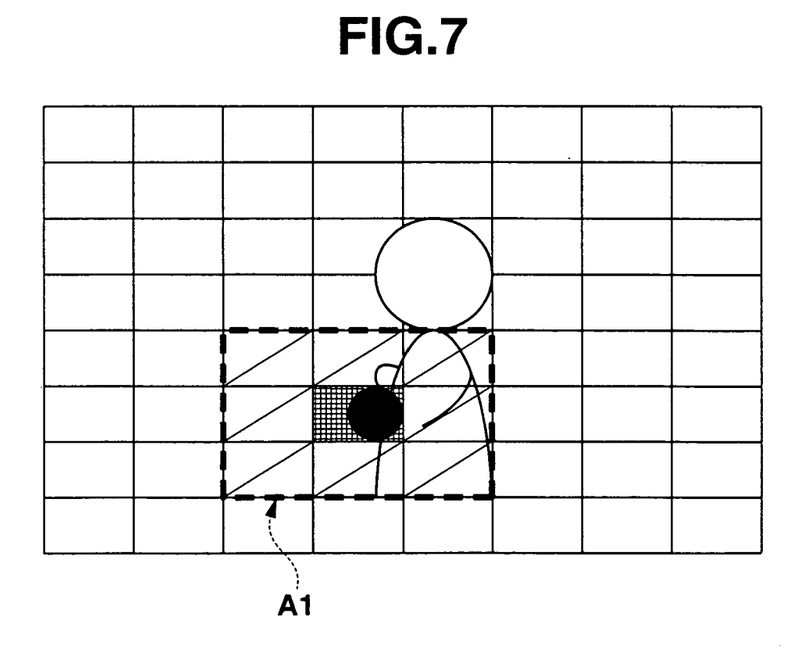
FIG. 7 is an explanatory diagram illustrating contents of area-designating AF operations.

When the operation command confirmed is area-designating AF, an area A1 covering the detection block settled as the transmitting position of infrared light in the block detecting process and its peripheral eight blocks is set as a focus area in automatic focus control, as shown in FIG. 7 (step SA7). In succession, the alarm unit 14 is allowed to sound a predetermined alarm sound to notify a user a start of image pick-up. Thereafter, AF, AE, and AWB are controlled respectively, image pick-up is made by means of the CCD 2, and the image data acquired as a result of image pickup is compressed to store it in the memory card 13 (steps SA10 to SA13).

Figure 8:
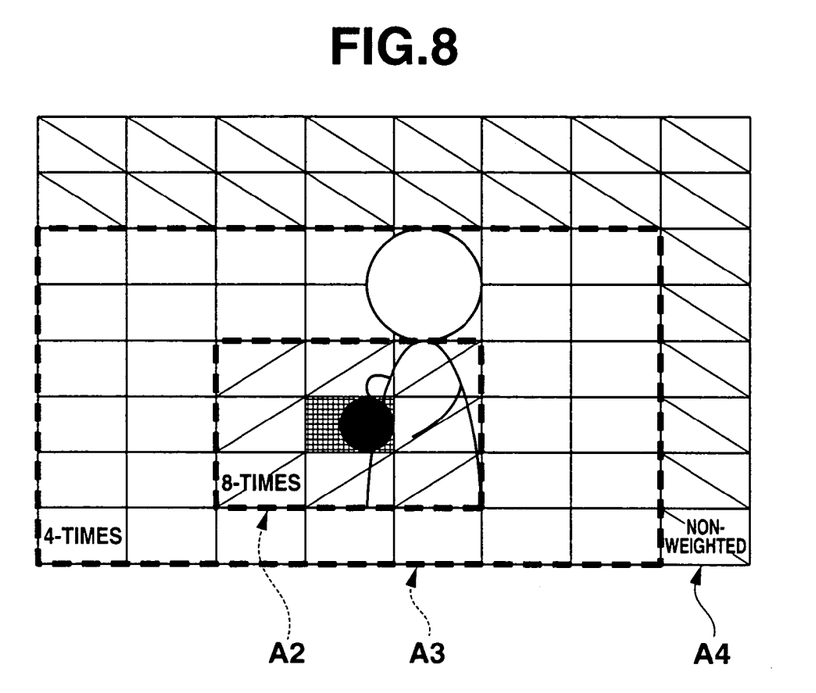
FIG. 8 is an explanatory diagram illustrating contents for weighting AE operations in different areas.

When the operation command confirmed in step SA6 is weighting AE for individual areas, the detection block and its peripheral eight blocks are set as shown in step SA9 to a higher order area A2 of eight-times weighted, its peripheral forty (maximum; however, in this example, thirty-three) blocks are set to a medium order area A3 of four-times weighted, and the other blocks are set to a lower order area A4 of non-weighted, respectively, as weighting areas in automatic exposure control as shown in FIG. 8 (step SA8). Thereafter, the processes in steps SA10 to SA13 are conducted to store image data.

Figure 9:
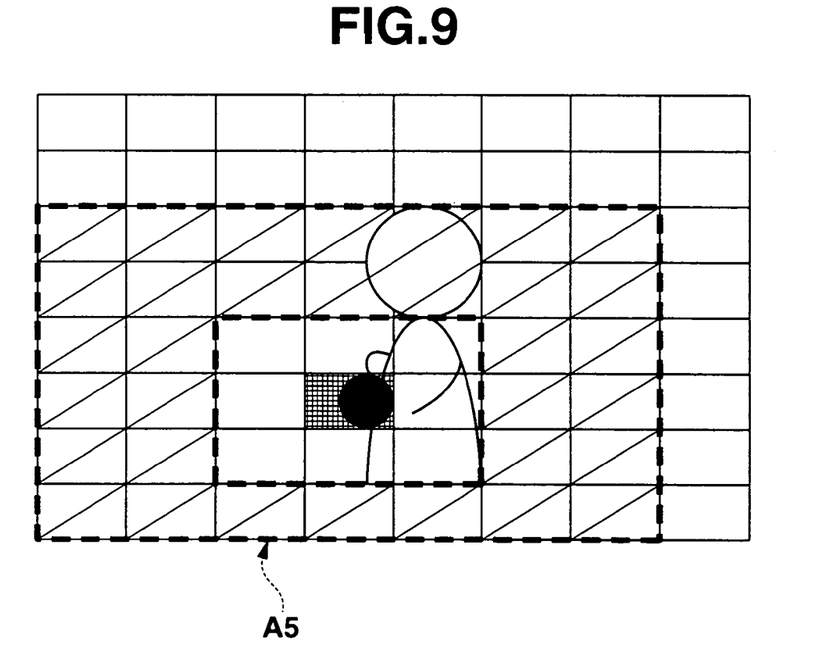
FIG. 9 is an explanatory diagram illustrating contents of area-designating AWB operations.

When the operation command confirmed in step SA6 is area-designating AWB, peripheral forty (maximum; however, in this example, thirty-three) blocks surrounding the near eight blocks around the above-described detection block are set as a color evaluation area in automatic white balance control as shown in FIG. 9. Thereafter, the processes in steps SA10 to SA13 are carried out to store image data.

In the above-described remote-controlled image pick-up mode, when an image pick-up operation in the area-designating AF mode is implemented with the infrared remote control unit by the user, such image pick-up operation wherein the user being the major object situated in the vicinity of a receiving position of infrared light keeps a precise focal point can be made in a highly accurate focusing condition. Furthermore, when an image pick-up operation in the weighting AE mode for each area is carried out, such image pick-up can be made in a highly precise exposing condition in which correct exposure has been achieved around the user. When an image pick-up operation in the area-designating AWB mode is effected, such image pick-up can be achieved in a condition in which white balance is adjusted on the basis of only a region excluding a periphery of the user, so that the image pick-up operation can be made in a condition in which highly accurate white balance which is not adversely affected by colors and the like of user's cloth is ensured. Therefore, according to the present embodiment, a photo detector for infrared signal can not only be eliminated, but also usability in the user can be enhanced.

Such configuration that image pick-up operations accompanied with the above-mentioned different controls (weighting AE for individual areas, area-designating AF, and area-designating AWB) wherein they are made to be possible by the use of the infrared remote control unit in the digital camera 1 has been described in the present embodiment. It may be configured for other operations than that of image pick-up in such a manner that the other operations are made in response to a transmitting position of infrared light in an optical image picked up, i.e. an object in accordance with operations of the infrared remote control unit. On one hand, movements relating to moving image may be made by operations of the infrared remote control unit in the case where the digital camera 1 involves functions for picking up moving image.

Moreover, although the present embodiment has been configured in such that a plurality of code data can be received by the use of the CCD 2 and discriminated, it may be arranged in such that only one code data is received.

Moreover, it may be arranged in such that only confirmation whether infrared light has been received or not as well as confirmation as to a position of an origin of transmission are allowed to effect without carrying code data on a remote control signal to be received and transmitted with infrared light, and when infrared light has been received, a predetermined operation is made. In this case, however, since it is easily affected by light (noise) derived from that other than the infrared remote control unit, presence of reception of light is liable to be detected erroneously. Accordingly, it is desirable that code data are carried on a remote control signal as in the present embodiment, and a predetermined operation is made in only when the code data could be received.

Further, it is desirable that exposure timing of the CCD 2 is synchronized with a signal cycle of infrared light in receiving code data as in the present embodiment when the code data are to be carried on a remote control signal. More specifically, when both the components have been synchronized with each other and the code data is carried on a remote control signal, generation rate of erroneous detection can be further decreased. This is extremely effective in the case where a bit width of code data is especially wide.

Modifications of the embodiment as explained above will be described hereinafter. In the aforementioned embodiment, detection for a transmitting position of infrared light has been carried out by a comparatively large block which has been set previously in accordance with the block detecting process shown in FIG. 6. However, the transmitting position of infrared light can be detected by a single pixel or plural pixels.

Furthermore, such transmitting position of infrared light is continuously detected for a certain period of time, the results are sequentially stored, and after a certain period of time has been elapsed, a specific area is established on the basis of changes in plural transmitting positions stored during the above-described period. For instance, such a region (circle, rectangle and the like) including all the plurality of transmitting positions is made to be a specific area. Then, image pick-up operations accompanied with AF process, AE process, and AWB process are allowed to carry out upon only such specific area as its object. Concerning types of AF process and the like in image pick-up operations, they may be previously set by the user, or may be a process corresponding to accumulated code data obtained by such an arrangement that detection for transmitting positions is continuously implemented, during which the aforementioned code data are accumulated in parallel to the detection.

According to such modifications as described above, an objective area for AF process and the like can be freely specified by the user at the time of image pick-up operation, so that usability thereof is further enhanced.

Apart from the above description, an operation which will be described hereinafter may be effected. As mentioned above, detection of transmitting positions of infrared light is continuously carried out for a certain period of time, the results are sequentially stored, and thereafter a moving pattern of the infrared remote control unit being a source for transmitting infrared light is recognized on the basis of changes in a plurality of transmitting positions which have been stored during the certain period of time. Moving patterns to be recognized must be the ones which can be easily recognized, for example, they may be patterns of vertical movements, horizontal movements, and movements for drawing a large circle. A recognizing method is arbitrary, and for example, it may be a manner wherein a plurality of transmitting positions are plotted on a coordinate corresponding to detection pixel units in a memory, and its distributed plot is subjected to pattern recognition.

Moreover, a command table indicating moving patterns to be recognized and image pick-up commands for AF process and the like has been stored. When the moving pattern is recognized, first, such an area where a vicinity of the infrared remote control unit is moved, for example, a certain area being the one centering around a transmitting position at any timing, and a part or the whole of the transmitting positions detected, in other words, an area containing a part or all of moving traces of the infrared remote control unit are set as a specific area. Then, an image pick-up operation accompanied with a process corresponding to the aforementioned moving pattern is carried out with respect to only such area as described above as an object.

According to the above-described modification, for instance, an image pick-up operation accompanied with AF process wherein a principal object is a user oneself can be effected by moving horizontally the infrared remote control unit, and an image pick-up operation accompanied with AWB process wherein the user oneself and a periphery thereof are made to be a color evaluation area (or an area excluding the color evaluation area) by moving vertically the infrared remote control unit. Therefore, usability of the digital camera involving such arrangements as described above is further enhanced. Similar to the first embodiment, if the specific code data is carried on the remote control signal and the above operations are enabled only when the code data could be received, erroneous operations due to erroneous detection of remote control signals can be prevented.

In the above description, the present invention is applied to the digital camera 1. However, the present invention may be applied to a movie camera, a cellular phone with a camera, a PDA Personal Digital Assistant with a camera, a personal computer with a camera and the like other than the digital camera. In addition, the present invention is also applicable for a silver salt camera which involves an image pickup device such as COD, and CMOS (Complementary Metal Oxide Semiconductor) sensor, but does not use such device for acquiring picture images. Further, when a program contained in existing digital cameras and the like is merely modified or updated, the same operations as those of the present embodiment can be realized.

The invention claimed is:

1. A camera apparatus comprising:
    an image pickup device which acquires an object image and outputs an image signal;
    a recording unit which records the image signal output from the pickup device;
    a first detector which detects a light of a predetermined wavelength included in the object image based on the image signal output from the image pickup device;
    a determination unit which determines whether an image pickup frame period is synchronized with a period of an optical signal which is included in the image signal output from the image pickup device;
    a synchronizing unit which synchronizes the image pickup frame period with the period of the optical signal by shifting a phase of the image pickup frame period when the determination unit determines that the image pickup frame period is not synchronized with the period of the optical signal; and
    a controller which executes a predetermined control operation when the light of the predetermined wavelength is detected by the detector.

2. The camera apparatus according to claim 1, wherein:
    the first detector detects a transmitting position of the light; and
    the controller executes the predetermined control operation based on the transmitting position of the light detected by the first detector.

3. The camera apparatus according to claim 2, further comprising:
    a second detector which detects a plurality of types of code data which are transmitted by the optical signal, which is periodically output from the image pickup device; and
    wherein the controller executes the control operation based on the plurality of types of code data detected by the second detector.

4. The camera apparatus according to claim 3, wherein:
    the first detector detects the light before the second detector detects the code data.

5. A camera operation method comprising:
    acquiring an object image and outputting an image signal;
    recording the output image signal;
    detecting a light of a predetermined wavelength included in the object image based on the output image signal;
    determining whether an image pickup frame period is synchronized with a period of an optical signal which is included in the output image signal;
    synchronizing the image pickup frame period with the period of the optical signal by shifting a phase of the image pickup frame period when it is determined that the image pickup frame period is not synchronized with the period of the optical signal; and
    executing a predetermined control operation when the light of the predetermined wavelength is detected.

* * * * *